May 19, 1953 D. W. RUEDEMANN 2,638,871

SELF-FEEDER SILO

Filed Dec. 8, 1950 5 Sheets-Sheet 1

Dana W. Ruedemann

BY

Peck & Peck

ATTORNEYS

May 19, 1953 D. W. RUEDEMANN 2,638,871

SELF-FEEDER SILO

Filed Dec. 8, 1950 5 Sheets-Sheet 2

INVENTOR

Dana W. Ruedemann

BY

Peck & Peck

ATTORNEYS

SELF-FEEDER SILO

Filed Dec. 8, 1950 5 Sheets-Sheet 3

INVENTOR
Dana W. Ruedemann
BY
Peck & Peck
ATTORNEYS

May 19, 1953 D. W. RUEDEMANN 2,638,871

SELF-FEEDER SILO

Filed Dec. 8, 1950 5 Sheets-Sheet 4

INVENTOR

Dana W. Ruedemann

BY Peck & Peck

ATTORNEYS

INVENTOR
Dana W. Ruedemann
BY Peck & Peck
ATTORNEYS

Patented May 19, 1953

2,638,871

UNITED STATES PATENT OFFICE 2,638,871

SELF-FEEDER SILO

Dana W. Ruedemann, Plainsboro, N. J.

Application December 8, 1950, Serial No. 199,872

9 Claims. (Cl. 119—53)

This invention relates broadly to the art of self-feeders for stock, and in its more specific aspects it relates to silos which are constructed and designed to automatically feed and dispense the silo contained silage to cattle; and the nature and objects of the invention will be readily recognized and understood by those skilled in the arts to which it relates in the light of the following explanation and detailed description of the accompanying drawings illustrating what I at present believe to be the preferred embodiments and mechanical expressions of my invention from among various other forms, arrangements, combinations and constructions, of which the invention is capable within the spirit and scope thereof.

The problem of feeding silage to cattle has received much attention, and particularly arrangements for automatically feeding and dispensing silage to cattle from enclosures for storing large masses of forage. This interest and effort to develop means for automatically feeding from a great mass of stored forage flows from the desire of livestock farmers to eliminate the time consuming, expensive and hard labor required for handling of two or more tons of silage for every animal each year. It is conventional practice at present to fork or otherwise manually remove the stored silage from the storage bin, silo or other storage means for each feeding and since it is recognized that each animal will consume two or more tons of silage in a year it will be appreciated that a tremendous number of man hours are used up in feeding the stock on the average livestock farm.

It is customary to store forage in a silo for fermentation therein forming silage for the winter feeding of cattle and other stock. Since typical silos of today vary in diameter between ten and twenty feet and in height between twenty and fifty feet it will be apparent that even the effective capacity of a small silo will be such that a large and heavy mass of silage will be contained therein. This mass of silage which is stored within a silo becomes packed therein and in effect may become a substantially unitary mass which is difficult to fork out for feeding purposes and also has presented difficult problems to workers in the art of self-feeding silos.

The primary purpose of a self-feeder silo is to feed the silage into position accessible to the cattle without the necessity of forking or otherwise manually removing desired quantities of the silage from the silo. The silo is usually provided with a plurality of openings adjacent the base thereof through which the silo contained silage is intended to automatically feed as it is consumed by the cattle. Some self-feeder silos with which I am familiar have been designed on the basic principle of feeding or getting the silage to the cattle which are entirely outside the silo. Experiments have shown that silos which merely get the silage to the cattle are generally unsatisfactory for a variety of reasons, one of which is that the wastage of silage is considerable. It has also been found that in silos which are constructed to get the silage to the cattle difficulties in feeding the silage within the silo to the discharge openings have been encountered.

I have discovered that a self-feeder silo which is constructed and arranged to get the cattle to the silage, instead of getting the silage to the cattle, will, provided certain other structural features and operational characteristics are adhered to, operate with complete success.

It has been my experience in working in this field that one of the major obstacles to a successful operation is this packing or binding characteristic of the silo contained mass of silage. This positive binding tendency of the heavy and packed mass prevents sliding or downward feeding of the mass to cattle consuming position adjacent the silo base. Obviously, when the silage packs and binds and does not flow downwardly in the silo, the silo ceases to be a self-feeder for it is necessary to somehow cause the mass, or at least a part thereof, to flow downwardly within the silo. The nature of the silage, lateral pressures, the way the silage is consumed by the cattle are all factors contributing to the binding action of the silage within the silo. I have found that binding of the mass may occur even though a large amount of silage has been eaten away at the feed openings.

I have successfully overcome this binding action of the mass of silage by providing means within the silo for effectively separating the mass of silage and directing it toward the feed openings. The means which I have devised creates pressures on the silage mass offsetting binding pressures and generates a constant force urging the lower section of the mass toward the feed openings which are provided in the silo. As I have pointed out above it has been one of my purposes to bring the cattle to the silage rather than to bring the silage to the cattle for in operating on this principle I have found that substantial operational efficiencies and economies result, as I shall point out hereinafter.

The tendency of the silage to bind and become wedged in the silo is exaggerated if the cattle are allowed to eat into the mass at and through the feed openings in a directionally uncontrolled fashion. If the cattle are allowed to eat into the silage in a haphazard manner forming recesses of varying sizes and shapes it will be appreciated that binding or wedging sections of silage will result. These sections will hold or support the silage against downward sliding movement toward feeding position, and the utility of the silo as a self-feeder ceases to exist. This binding occurs when there is no control of the areas which may be eaten by the cattle.

The self-feeder silo which I have designed permits the cattle to actually eat into the mass of silage within the silo, and provides effective and easily operable means to control the areas in which the cattle may eat. The control means are provided at each feed opening and are adjustable so that the animal may be forced to eat from an upper mass of silage or from a lower mass, or free feeding may be permitted. In this manner I provide a controlled feeding of the cattle so that the person in charge may regulate where the animal feeds to thereby eliminate the building up of wedging areas of silage which prevent free sliding of the silage mass into feeding position.

It is necessary in a self-feeder silo in which the cattle eat into the silage within the silo to guard against entrapment of the animal by the downward sliding of the mass of silage. The animal eats into the silage and under my controlled system of feeding, the animal will be forced to eat away in the form of an arc, and it will be understood that as the animal eats into the mass its head and forequarters will be under the mass of silage.

The self-feeder silo of this invention provides means for protecting the animal which has eaten a substantial distance into the silage mass from being trapped by a downward movement of the mass which is above it. This means not only protects the animal against entrapment but it also permits the cattle to safely eat a further distance into the silage than has heretofore been possible. This is advantageous for it results in freer flow of the mass of silage and greatly reduces wastage of silage.

The arrangement which I have designed for protecting the cattle against entrapment and for permitting the cattle to eat further ino the silage not only serves those purposes but also functions to prevent wastage of the silage. As I have pointed out above, the means I have incorporated in the silo for aiding in keeping the silage from becoming wedged and for directing the silage toward the openings is truly effective in its action and the device which protects the cattle also maintains the silage from being ejected from the silo by the silage directing arrangement. The combination of these members produces a self-feeding silo which is highly satisfactory in its operation and requires substantially no attention to keep the mass of silage flowing to feeding position.

When a self-feeder silo of the character of that herein involved is to be loaded with forage the feed openings at the base thereof are closed and the silo is filled and the fermenting process begins. I have devised a desirable and successful operating procedure which may be followed when the silage is in condition for consumption by the cattle. The feeding action is preferably initiated by opening certain predetermined feed openings for access of the cattle to the silage, which are allowed to eat in a directionally controlled manner as heretofore described. When sufficient silage has been eaten away at any one or more feed openings the protective means, which are removed prior to filling the silo, are installed. It is to be understood that the feed openings are all finally opened and when the protective means have been installed at each opening the silo is in condition for self-feeding the silage mass within the silo.

Silos of conventional type and already built having no self feeding adjuncts may be readily reconstructed to incorporate therein the self-feeding organization whereby I achieve the highly successful self feeding results.

The advantages of an efficient silo which is positively self-feeding will be readily apparent. The silo need only be accessible to the cattle at feeding time and several may feed simultaneously. The only attention the feeder will require is the adjustment of the mechanism for controlling the directional feeding of the cattle and in many instances this will not require attention at each feeding. The silage will feed automatically to the feed openings in reach of the cattle and no physical attention is required for ensuring sliding of the mass within the silos. The economies in labor flowing from the use of one or more self-feeder silos on a livestock farm will be evident.

Self-feeding silos of the type with which I am concerned may be economically built and the silo structure itself is not weakened or otherwise harmed by the incorporation therein of the self feeding organization.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figures 1, 2, 3, 4:
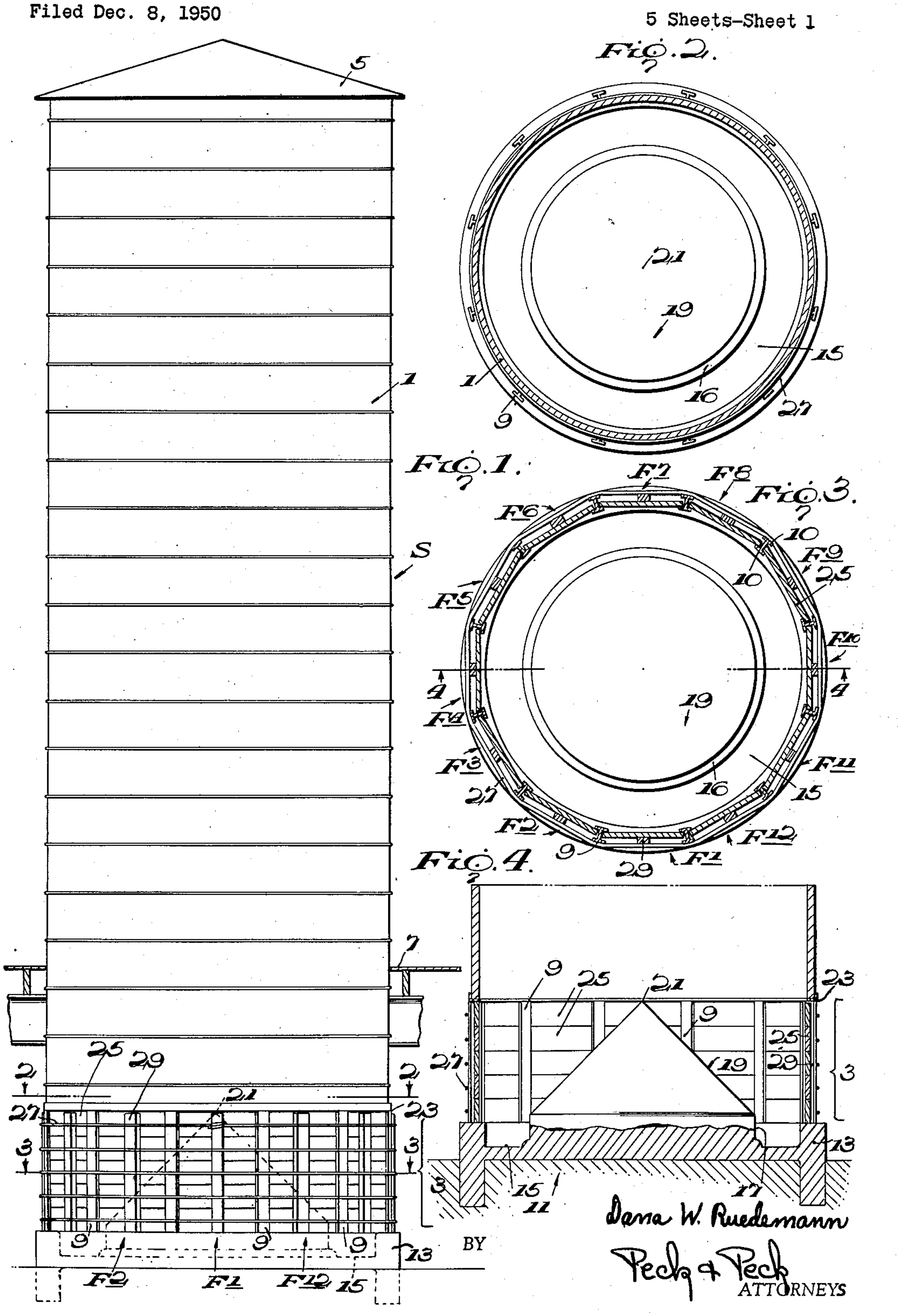
Fig. 1 is a view in elevation of a self-feeder silo with the feed openings closed prior to being opened for the self-feeding operation.
Fig. 2 is a view in horizontal section taken on line 2—2 of Fig. 1.
Fig. 3 is a view in horizontal section taken on line 3—3 of Fig. 1.
Fig. 4 is a view in vertical section taken on line 4—4 of Fig. 3, through the lower feeding portion of the silo, the upper or main storage portion of the silo being broken away.

Referring to the accompanying drawings, and particularly to Fig. 1 thereof, wherein I have used the letter S to designate in its entirety a self-feeding silo which may be constructed of masonry, such as concrete staves, or may be of monolithic type, wood or of metal, or of any other suitable type, and which includes a cylindrical storage or cell portion 1, a lower feeding portion 3 and, if desired, a roof or top 5. While I have illustrated a silo having a roof it is to be understood that this is not necessary for the operation of the self-feeding silo. It will be appreciated that the cylindrical storage portion 1 of the self-feeder silo may be of conventional form and may be of any desired height and diameter so as to have a suitable storage capacity for forage. Silos which are not of constant diameter may be used as the storage cell of my self-feeder silo if desired. For instance, a silo having a downwardly increasing diameter may be employed. The self-feeder silo may be surrounded if desired by a shed forming roof 7 through which the silo extends to give weather protection to the cattle when feeding.

The silo proper 1 constituting the major storage cell of the self-feeder unit is supported on a plurality of circumferentially spaced columns 9 which are preferably though not necessarily formed of metal of H cross section. The columns should be of an order to support the vertical load of all silage and the cylindrical shell 1, as well as the lateral outward pressure of the silage. The columns are anchored to and supported on any suitable base or foundation indicated generally by the numeral 11 and which, in the particular example illustrated in the drawings includes an annular concrete curbing 13 in which the columns are anchored. The height of the columns may vary from five to seven feet depending upon the diameter of the silo structure 1 and the number of columns 9 may vary depending upon the size of the silo structure and the number and width of the feed openings or stations desired. The circumferential spacing of the supporting columns may also vary in accordance with the size of the bulkhead closure means which may be used with a particular installation. As will be explained hereinafter the space between the columns 9 provides feeding stations for the cattle and the space 3 between the lower end of silo proper 1 and the foundation constitutes what I term the feeding portion of the self-feeder silo.

The foundation 11 of the silo which is preferably of concrete extends radially inwardly from the curb 13 forming an annular gutter 15 which is, of course, below the horizontal plane of the top of the gutter. Around the inner perimeter of gutter 15 I may provide an annular shoulder 16 which is substantially below the top plane of curb 13. Rising from the inner perimeter of shoulder 16 is a circular upstanding supporting base 17 which extends upwardly above the upper surface of curb 13 and is preferably though not necessarily of solid concrete construction. A cone designated generally by the numeral 19 is formed on the supporting base 17 and extends upwardly therefrom with the apex 21 thereof positoned at the axial center of the silo proper 1 and of the columns 9. The cone is so constructed that the apex thereof is not above the plane of the lower end 23 of the silo proper, or, in other words, is not higher than the top of the feeding portion 3, and in certain installations the apex may be a substantially greater distance below the top of the feeding portion 3 than as shown in the drawing example. In the example illustrated the cone 21 is substantially a true cone but a satisfactory operation may be had with cones whose surfaces have an angle of curvature. The cone 19 which is centrally positioned relative to the silo structure functions in a manner to be described in detail to divide the silage in the feeding zone and to exert pressures thereon constantly urging the silage toward the feed openings between columns 9.

While I have illustrated as one example a cone having an apex it is within my contemplation to use a cone having a rounded top or in certain installations I may flatten the top to form a truncated cone.

It will be recognized that conventional silo structures now in use may be redesigned to incorporate the self-feeding features of my invention by raising the silo proper 1, laying the foundation and the cone, and erecting the columns for the silo to rest on.

A silo of the self-feeding type of a size and capacity similar to the example illustrated in the drawings includes twelve columns 9 and twelve feeding stations F1, F2, F3, F4, F5, F6, F7, F8, F9, F10, F11, F12, each feeding station being defined by a pair of adjacent columns, a segment of the curb and lower annular end 23 of the silo proper between a pair of columns. These feeding stations or feed openings between the columns are of course open when the silo is in feeding operation so that the cattle may get to the silage within the silo, however, since it is customary for the forage originally put into the silo to ferment and remain stored before it is fed it will be recognized that during this storing and fermenting period the feed openings must be closed.

I have devised a novel structure for closing the feed openings during the forage storing period and a novel method of opening the feeding stations for cattle feeding when the stored feed is ready to be consumed.

Referring particularly to Figs. 1 through 4 of the drawings I have illustrated a self-feeder silo with the feed openings or stations F1 through F12 all closed so that the silo is in condition to be filled with forage.

I close each feeding station by means of a door which extends horizontally between a pair of columns and vertically between the curbing and the lower end 23 of the silo proper. Each door is independent of every other door and consists of a plurality of boards or planks 25 built up in edge to edge relation with their longitudinal edges abutting and the transverse end edges thereof extending into the columns 9 in position between the flanges 10 thereof. The doors are maintained in position, against the lateral pressures of the contained silage closing the feed openings or stations by means of their association with the columns and by a plurality of silo hoops 27 which extend circumferentially about the series of columns. In order to insure a tight fit of the doors I may use wedge blocks 29 which are driven into wedging position between a door and the hoops. With each feeding station or opening closed by a door as described the silo is in condition for filling with forage and for the storage thereof until in condition for feeding to cattle.

Figure 5:
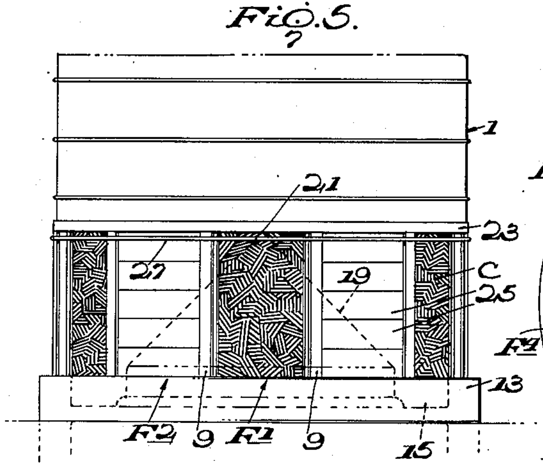
Fig. 5 is a schematic view in elevation through the lower feeding portion of a silo, with alternate closure means for the feed openings removed, the upper portion of the silo being broken away.
Figure 6:
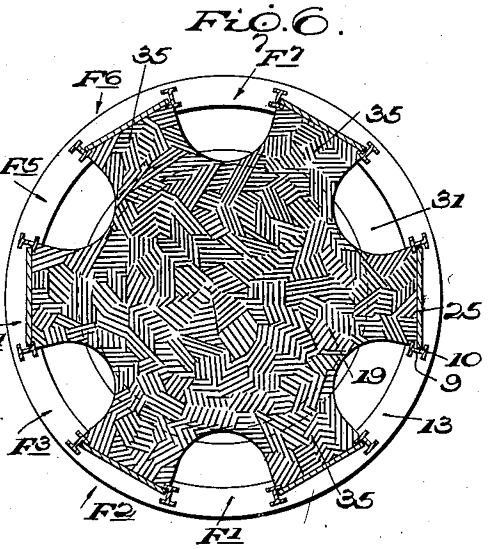
Fig. 6 is a schematic view in horizontal section with the closures of alternate feed openings removed and substantial amounts of silage having been consumed at said feed openings.
Figure 8:
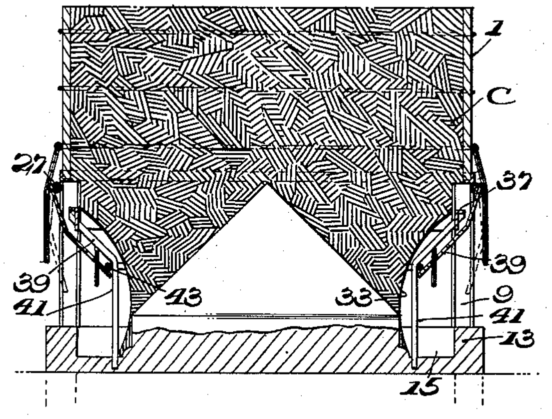
Fig. 8 is a schematic view in vertical section of the lower feeding section of the silo in the condition of that illustrated in Fig. 7, the upper part of the silo being broken away.
Figure 7:
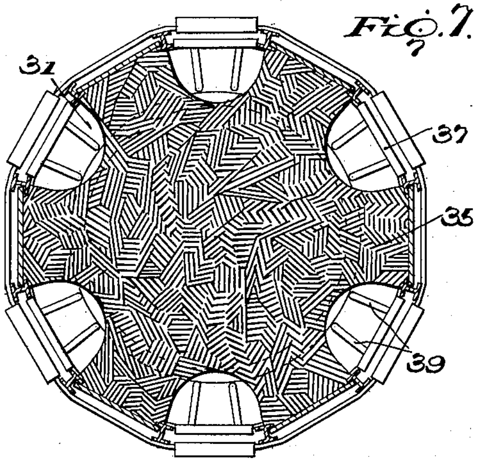
Fig. 7 is a view generally similar to Fig. 6 illustrating the silo of Fig. 6 after the installation of the protective devices and the directional control means in alternate feed openings from which the closures have been removed.
Figures 9, 10:
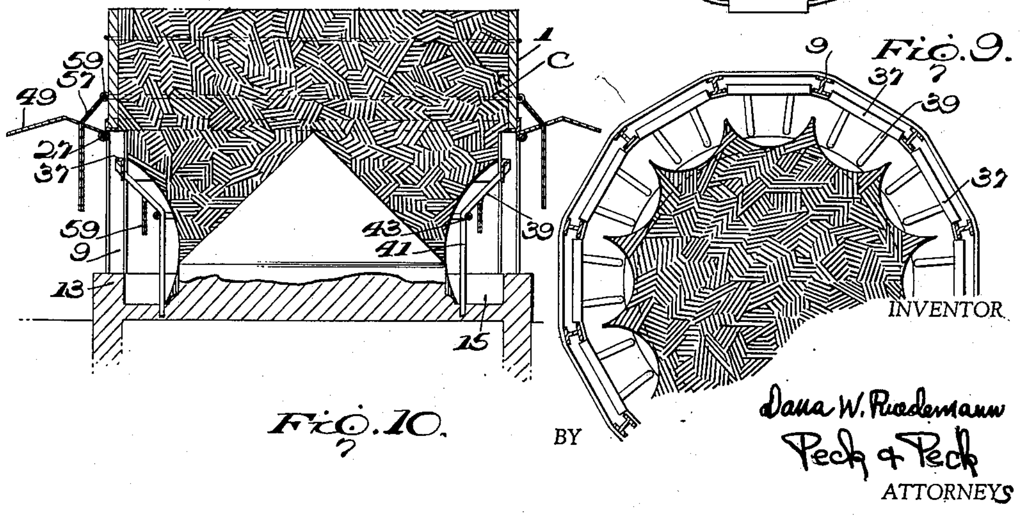
Fig. 9 is a schematic view in horizontal section generally similar to Figs. 6 and 7 but illustrating the condition of the silo after all of the feed openings have been opened and adjacent silage consumed and the protective and directional control devices have been installed at every opening, parts of the figure being broken away.
Fig. 10 is a schematic view in vertical section of the lower feeding portion of a silo with the directional control means in raised positions, the upper part of the silo being broken away.

When the silage in the self-feeder silo has matured and fermented sufficiently and the livestock farmer wishes to start feeding the silage to the cattle he preferably pursues the following course to place his self-feeder into condition where it will self-feed from every feeding station about the base of the organization. At the initiation of feeding from a fully charged silo it is preferable not to open all of the feeding stations and I have found the operation to be successful if alternate stations or feed openings are opened. Thus consideration of Figs. 5 and 6 illustrates the initial opening of a loaded silo wherein alternate stations F1, F3, F5, and so on are opened while stations F2, F4, F6 and so on remain closed. When a silo of this character is opened as described the hoops 27 may be removed, however it is preferable to leave the uppermost hoop in operative position encircling the columns 9. The doors are removed from alternate feeding stations by sliding each board 25 upwardly until the transverse ends are free of the flanges of columns 9. When the doors are removed the silage C is exposed at every other station where it is accessible to the livestock. I desire to point out that in certain installations it may be desirable at the outset to only remove a few of the uppermost boards 25 from a door so as to restrict the feed opening and then remove the remainder after some of the silage has been consumed.

Upon the removal of the doors in the manner specified those opened feeding stations alternately spaced about the feeding zone of the silo are in readiness for cattle feeding. An animal is permitted to eat into the silage at each station and will customarily eat thereinto in such manner that a recess 31 will be formed having an inner wall of silage which is of generally arcuate shape as at 33. Fig. 6 of the drawings is illustrative of the recesses which are eaten away at each open feeding station. Consideration of this figure discloses the condition of the silage after the alternate recesses have been eaten into the silage and shows the vertical supporting masses of silage 35 which are provided between each recess and at each closed feeding station. This disposition of the mass of silage produces a binding or wedging action preventing downward movement of the silage and keeps the recesses 31 open. At this stage of the process of opening all of the feeding stations it is desirable to keep the recesses free of silage, for as I am about to explain, certain parts of the self-feeding combination are installed in the recesses.

As I have pointed out above and as I shall describe more fully hereinafter one of the prime purposes of my invention is to get the cattle to the silage without subjecting an eating animal to the danger of entrapment by falling or sliding of the silage mass. I have accomplished this highly desirable result by providing a grid structure at each feeding station which permits the animal to eat further into the silage than has heretofore been possible and protects it from entrapment and this grid structure also prevents wastage of silage.

When the recesses 31 have been eaten into the silage at alternate feeding stations about the self-feeder organization the grid structure may be installed in these recesses. It will be understood that it is not necessary in the initiation of feeding to open alternate stations, while this is preferable, other opening variations may be followed and still fall within the spirit and scope of my invention. It is desirable however to let the recesses 31 to be eaten away in certain stations producing a binding or wedging action on the silage mass so that the recesses will remain open and substantially free of silage in order that the grid structure can be installed.

Figures 11, 12:
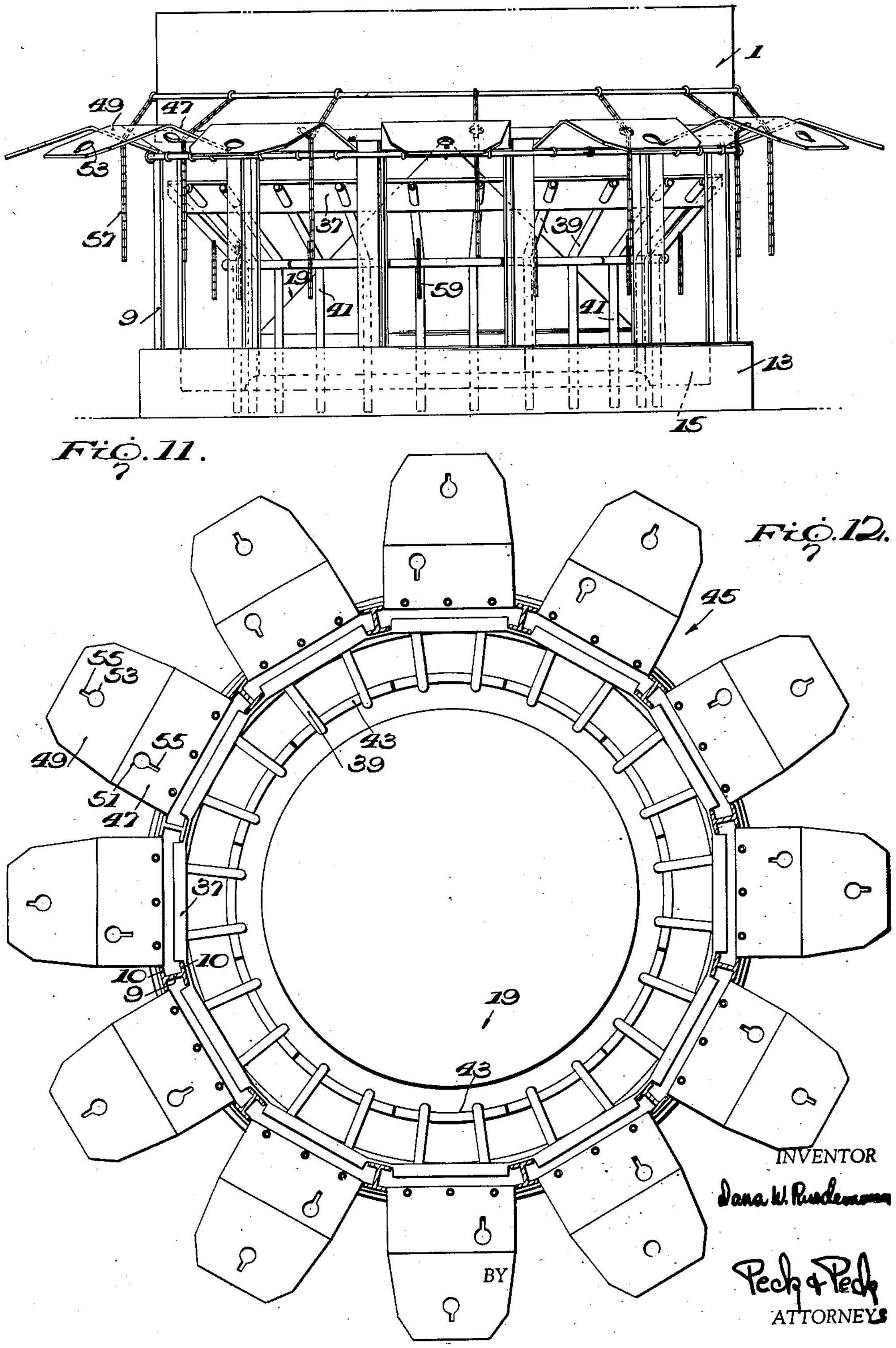
Fig. 11 is an enlarged view in elevation of a silo in complete full feeding condition with the directional control means in raised position, the upper part of the silo being broken away.
Fig. 12 is an enlarged view in horizontal section of the silo showing the directional control means in raised positions.

The grid structure includes mounting means such as channel iron bars 37 which are welded or otherwise securely mounted on and extending between columns 9 above the mid point thereof but below the upper ends of the columns. These channel iron bars are most clearly illustrated in Figs. 11 and 12 of the drawings and may be installed when the self-feeder organization is built or when the recesses 31 are formed. In the latter case it will be recognized that at this step in the preparation of the silo for full self-feeding operation the bars will only be installed between those columns defining the feeding stations F1, F3, F5 and so on. The grid structure further includes inwardly and downwardly extending steel pipes, rods or tubes 39 which at the upper ends thereof extend through openings which are provided in bars 37. Any suitable means may be employed to removably amount the rods 39 in the bars 37. Consideration of the drawings illustrates that each grid structure includes a pair of rods 39 spaced apart and inwardly extending and downwardly projecting from bars 37 a distance into recesses 31, which rods at their inner ends are bent to extend downwardly forming uprights 41 which are anchored at their lower ends in the concrete forming the floor of gutter 15. Each individual grid structure may include a horizontal reinforcing member or bar 43 which extends between the uprights and the inclined rods at the bend thereof. Each grid structure for each feeding station consists of the inclined bars 39 and the uprights 41, which may constitute an integral structure or the inclined bars and uprights may be separate elements secured together in any suitable manner. Thus, a grid structure is installed in each recess 31 which has been eaten into the silage at the opened feeding stations F1, F3, F5 and so on.

The grid structures are preferably not installed prior to filling the silo with forage as a better filling operation results and the considerable strain of the forage falling on the grid structures when the silo is being filled might damage them. It will be understood that one of the functions of uprights 41 is to support inclined rods 39 which support the mass of silage.

Each feeding station is provided with means for controlling the direction of eating of an animal at a feeding station. Such directional control means comprises a swinging metal or the like deflector plate designated generally by the numeral 45 which is pivotally mounted on the upper silo hoop 27. The directional control plate may be mounted in any other suitable manner for swinging to and from position barring the animal from eating between the inclined rod members 39.

Each directional control plate 45 is preferably though not necessarily constructed of sheet metal and includes two angled deflector sections, an upper section 47 and a lower section 49 providing an obtuse angle with the section 47, the section 49 being angled when the control means is in operative position to extend towards the interior of the silo. Each deflector section 47 and 49 is provided with a circular aperture 51 and 53 respectively therein. A locking slot 55 is cut into the metal of the sections adjacent the aperture and each slot is so formed that it opens into the aperture. The directional control plate 45 is adapted to be adjustably maintained in various positions for controlling the direction of eating, or the area of silage which may be eaten at a feeding station by an animal. I suspend a chain or other member 57 from the silo as at 59' and the chain extends through the opening or aperture 51 which is provided in the upper deflector section 47 of the directional control means. The chain 57 functions to hold the directional control means 45 in raised position as particularly illustrated in Fig. 13 of the drawings. In order to maintain this directional control means in elevated position it is raised to the desired position whereupon the chain 57 is pulled into the slot 55 and since the slot is of less width than the diameter of the chain links, it will be recognized that the chain will not slide therethrough and the directional control means will be releasably maintained in elevated position. A further chain or supporting means 59 is fastened to and suspended from the inclined rods 39 as at 61 and reference to Fig. 14 of the drawing illustrates how this chain functions in locking the directional control means in inwardly swung position with the lower angle plate 49 thereof disposed adjacent to the rods 39 in order to keep the animal from eating upwardly through the rods. This chain 59 which extends through the aperture 53 is drawn into the slot 55 to thereby lock the directional control means in inwardly swung position.

It is also within my contemplation to mount the directional control means when each feeding station is originally opened and before any silage has been eaten to form the recesses 31. In certain installations this may be found to be desirable.

When the grid structures have been installed at every feeding station, F1, F3, F5, and so on, and when the directional control means 45 have been mounted and installed at each of these feeding stations, the silo is then in condition for opening the remaining feeding stations F2, F4, F6, etc. which had not been initially opened. These feeding stations are, of course, opened by removing the doors in a manner as heretofore described with reference to the feeding stations which were originally opened. When the feeding stations F2, F4, F6 and so on have been opened and eaten into to form recesses in the silage which are generally similar to the recesses 31, a grid structure is installed in each such recess in the same manner as the grid structures were installed in the originally opened feeding stations F1, F3, F5 and so on. Similarly, a directional control deflector means 45 is mounted at each feeding station.

I desire to point out at this time that in certain installations it may be found desirable to open a feeding station such as F2, and to permit the animal to eat into the silage so that that particular grid structure and directional control means may be installed prior to opening the remainder of the closed stations F4, F6, etc. The procedure which is followed in opening these stations, whether one at a time or all at once, will depend somewhat on the condition of the contained mass of silage and its tendency to bind and wedge within the silo.

Figs. 9 through 12 illustrate the conditions of my self-feeder silo after all of the feeding stations have been opened and a grid structure and directional control means has been provided for each feeding station. At this point the silo is in readiness for full and complete automatic self-feeding and it will be appreciated that a grid structure extends into the silo or the silage zone at each feeding station and a directional control means 45 is provided at each feeding station to control the direction of eating of each animal at each station.

During the process of opening the silo conditioning it for full self-feeding operation it has been my object to produce a wedging action in the contained mass so that it will not slide downwardly. At this point wedging or nonsliding is desired so that the grid structures may be installed at each feeding station. However, after the installation of all the grids is completed then sliding of the mass is desired to keep silage accessible at the feeding stations.

As I have pointed out one of the major difficulties which has been encountered in the production of an efficient self-feeder silo resides in the positive tendency of the mass of silage to wedge or bind and not to slide downwardly in the silo to the feeding stations. I have eliminated and definitely overcome this problem of silage binding by the particular combination of the conical silage dividing and pressure exerting element 19 with the grid structure. By constructing the conical element so that the apex thereof is not above the top of the feed opening, I produce upward and lateral pressures on the silage all in a direction towards the opening and not towards the cylindrical walls of the silo. Thus it will be appreciated that this produces a force on the silage within the feeding zone tending to eject the silage from the silo at the feed openings. In order to stop the expulsion of silage at the feed openings which would, of course, result in considerable wastage, I have provided one of these grid structures at each feed station, the grid structure functioning to hold the silage within the zone of the silo so that it may not be ejected from the silo under the pressures exerted thereon by the conical member. The grid structure also functions to permit the animal at each feed station to actually get into the silage without danger of entrapment. It will be apparent that the inclined upper rods of the grid structure prevent any substantial amount of silage from falling therebelow upon an eating animal and the uprights 41 of the grid structure not only support the rods 39 but also limit the distance inwardly that the animal may go in eating. The upright and the inclined rods of each grid structure are, of course, spaced apart a sufficient distance to permit a cow to eat therethrough and therebetween.

Figure 13:
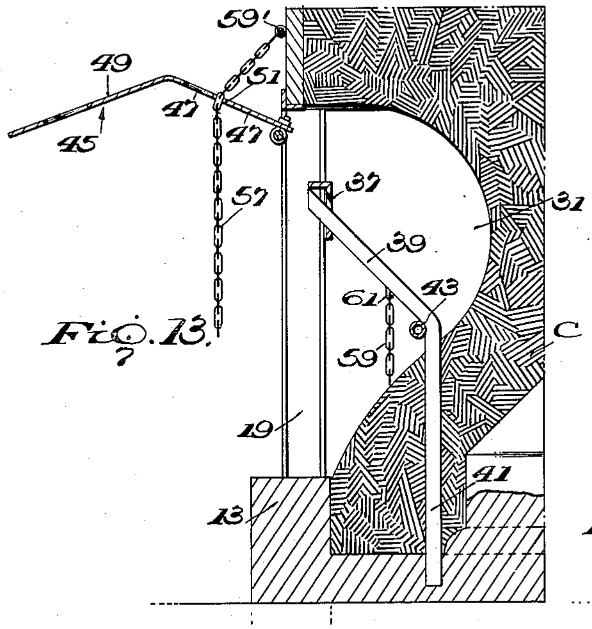
Fig. 13 is an enlarged detailed vertical sectional view of one of the feeding stations with the directional control means in raised position.

It is a well known fact that an animal of the class adapted to be fed by my self-feeder will normally eat upwardly and it is for this reason that I have provided the directional control means at each feeding station. Fig. 13 of the drawings illustrates how an animal will normally eat into the silage if its direction of eating is not controlled. A recess 31 in the silage is eaten by the animal when the directional control means 45 is in elevated position and it will be seen that the silage at the lower part of the feeding station has not been consumed because of the animal's natural habit of eating upwardly. When the attendant in charge of the feeding animals desires the animal at a particular station to eat downwardly, the chain 57 is released from its locked position in slot 55 of aperture 53 so that the directional control means or deflector may swing downwardly so that the lower deflecting section 49 is in the position illustrated in Fig. 14 of the drawings whereupon it is locked in this position by disposing the chain 59 in slot 55 of aperture 51. With the directional control deflecting means in the position illustrated in Fig. 14 of the drawings, the animal will be forced to eat the silage at the lower part of the feeding station since the lower deflecting plate 49 closes the upper part of the silage off from the feeding animal.

Figure 14:
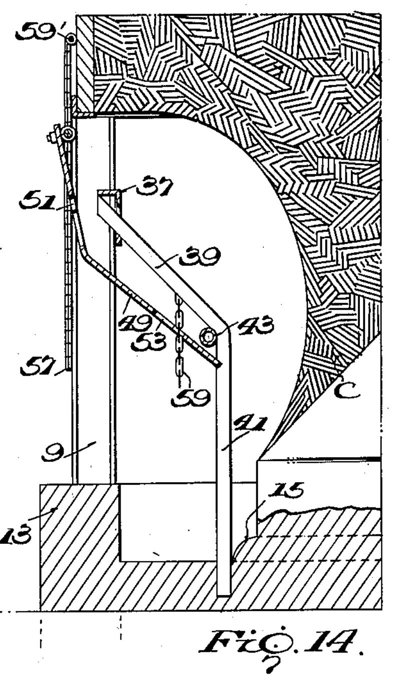
Fig. 14 is a detailed view similar to Fig. 13 but with the directional control means in lower position.
Figure 15:
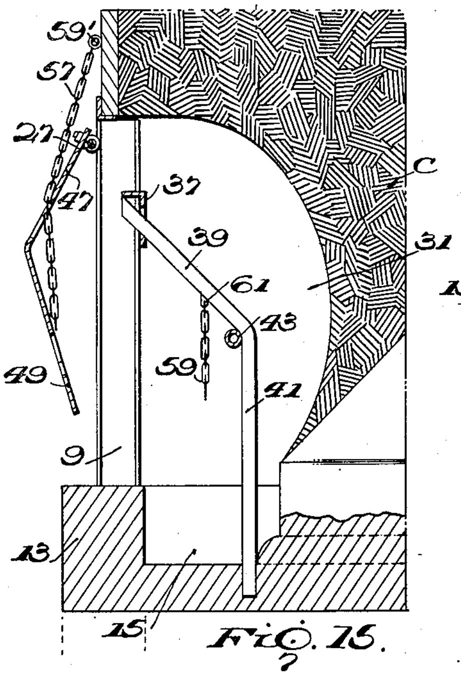
Fig. 15 is a view similar to Figs. 13 and 14 but with the directional control means intermediate the positions illustrated in Figs. 13 and 14.

Fig. 15 of the drawings discloses the directional control means 45 hanging loosely in a position intermediate the positions illustrated in Figs. 13 and 14 of the drawings. In this position the member 45 closes a major part of the feed opening except at the base thereof. The member 45 may be left in this position when a particular feeding station is not in use and when a feeding operation is in progress but it is not desired to use a station.

The directional control means 45 also serves to control feeding in the space between supporting bars 37 and the bottom of the silo proper. Referring to Fig. 14 it will be seen that in downwardly swung position the upper plate section 47 covers the space so that silage therein cannot be reached by a feeding animal, while it is accessible to the animal when the control means is in raised position as shown in Fig. 13. This space is also closed off when the directional control means is hanging in the position illustrated in Fig. 15 of the drawings.

It will now be clearly understood that the cattle may get right into the silage zone when feeding and that they are protected against entrapment by the grid structure at each feeding station. The grid structures also prevent wastage of silage. My self-feeder organization also ensures that a supply of silage will be accessible to the cattle, for by keeping the apex of the cone at or below the top of the feed openings the silage is constantly urged toward the feed openings and binding and wedging in the feeding zone is eliminated.

The elimination of binding or wedging of the silage mass so that it will feed or slide downwardly into feed position is one of the attributes of my feeder and this desired sliding action is greatly accelerated by controlling the direction of feeding of each animal. If an animal is allowed to eat in a directionally uncontrolled manner so that recesses are formed in the silage only at the upper areas of each opening (see Fig. 13 of the drawings), for instance, wedging sections of silage will be built up at the feeding zone and these will act as supports for the rest of the silage which will be kept from sliding downwardly and there will be little or no silage accessible for the animals. My directional control means for regulating where an animal may eat are operated so that an even eating away of silage will result and binding and wedging points will not be built up to prevent silage feeding. One of the major factors contributing to the success of my self-feeder silos is the combination of the divider and pressure exerting means with the grid structures and with the means for regulating where an animal may eat at each feeding station.

In the self-feeding operation all or some of the feeding stations may be used simultaneously and of course each directional control means is independent of every other one so that the direction of eating may be different at different stations.

Figure 17:
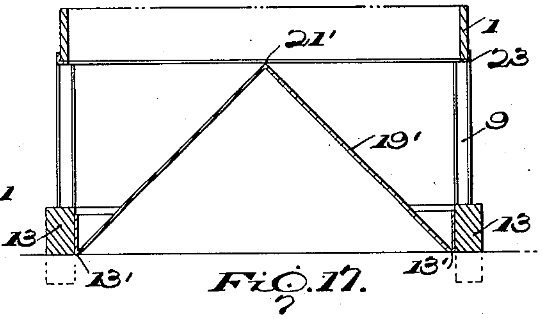
Fig. 17 is a view in vertical section of a modified form of conical silage directing means within the lower feeding portion of a silo, the upper portion of the silo being broken away.

In Fig. 17 of the drawings I have illustrated a modified form of my invention and have used the same reference numerals as heretofore used for parts which are the same. In this form of my invention I have eliminated the circular base upon which the cone is mounted and instead I have carried the surfaces of the cone 19' downwardly until they contact base of curbing 13, as at 13'. It will be noted that the apex 21' of cone 19' is substantially in the horizontal plane of the top of the feed openings. The self-feeder silo of Fig. 17 is of course provided with the grid structures and the directional control means as is the self-feeder of the preferred form of my invention.

Figure 18:
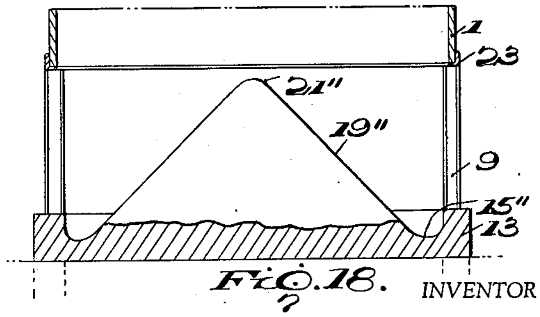
Fig. 18 is a view in vertical section of a further form of conical silage directing means within the lower feeding portion of a silo, the upper portion of the silo being broken away.
Figure 16:
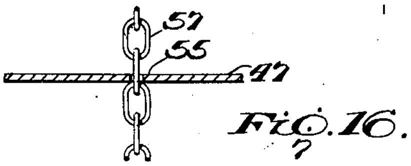
Fig. 16 is a detail view in section of the directional control means and the adjusting and locking member therefor.

In Fig. 18 of the drawings I have illustrated another form which my invention may take, and again I have used the same reference characters heretofore used for similar parts. The cone 19'' has a rounded apex 21'' which is below the plane of the lower end 23 of silo 1. At its lower end or base the cone 19'' is upwardly curved forming a curved gutter area 15''. A self-feeder silo having a cone 19'' is also adapted to include the grid structures and the directional feeding control means of the preferred form of my invention. It is within the spirit and scope of my invention to use a cone 19'' with apex 21'' in place of the cone of the preferred form of my invention if desired, or the rounded apex 21'' may, if desired, be substituted for apex 21 of the preferred form of the invention.

Figure 19:
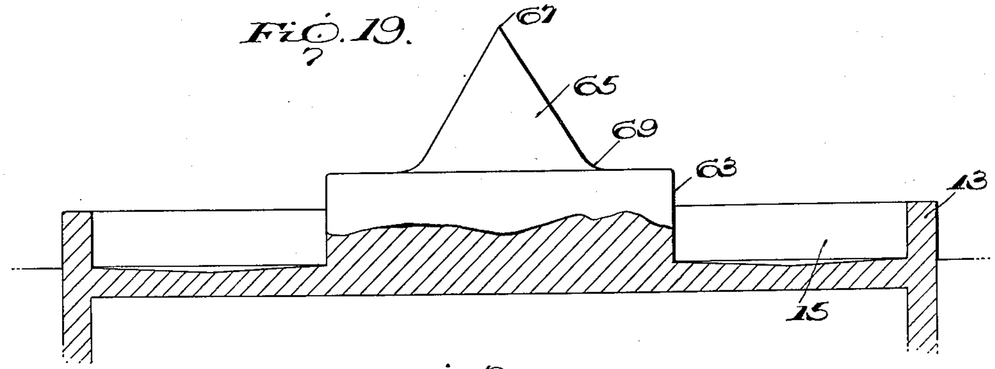
Fig. 19 is a view in vertical section of a modified form of divider to be positioned within a silo.

In Fig. 19 of the drawings I have illustrated a further form of divider for the mass of silage. In this form of my invention I provide a circular base or platform 63 concentrically disposed within the silo and on this base I mount a pyramid divider 65 having the apex 67 thereof substantially below the top 23 of the feed openings. I preferably slope the sides of the pyramid adjacent the base thereof as at 69 so as to eliminate sharp angles where the sides join the platform. The diameter of the platform is substantially larger than the dimensions of the base of the pyramid.

Figures 20, 21:
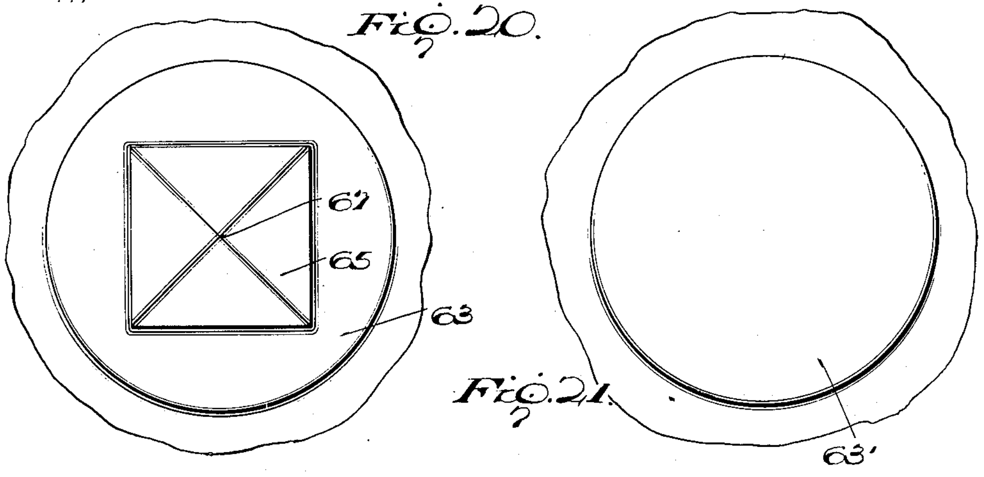
Fig. 20 is a top plan view of the divider of Fig. 19, parts of the silo being broken away.
Fig. 21 is a top plan view of a further form of self-feeder divider.
Figure 22:
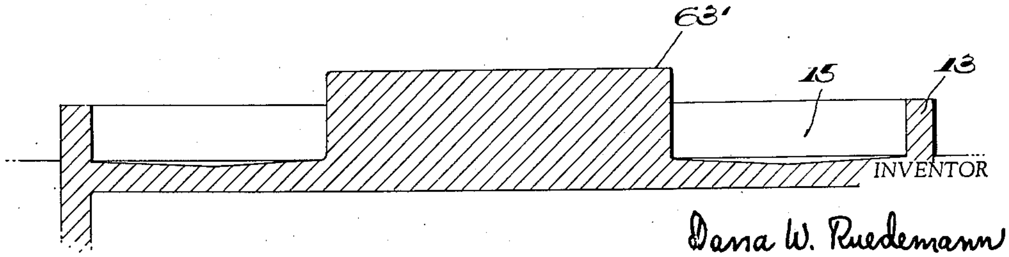
Fig. 22 is a view in section of the divider illustrated in Fig. 21.

In Fig. 21 of the drawings I have illustrated a type of self-feeder silo in which an upstanding divider is eliminated. In this form of my invention I provide a circular base or platform 63' concentrically positioned within the silo and do not mount a divider thereon. It is within my contemplation to use this platform alone in certain installations.

I claim:

1. In a self-feeder silo, in combination, a storage cell for silage having a feeding zone and a plurality of feed openings about the base of the cell, means within the cell within the contained mass of silage for dividing the silage and constantly urging the silage in the feeding zone toward the feed openings, and means mounted within the cell at each feed opening preventing ejection of the silage through the opening while permitting an animal to eat into the silage and preventing the animal from being trapped by falling silage, said second named means including spaced uprights and spaced top bars connected therewith.

2. In a self-feeder silo, in combination, a storage cell for silage having a feeding zone and a plurality of feed openings about the base thereof, means within the cell within the contained mass of silage for dividing the silage and constantly urging the silage in the feding zone toward the feed openings, and means mounted within the cell at each feed opening preventing the ejection of the silage through the opening while permitting an animal to eat into the silage, and adjustable means mounted adjacent each feed opening in an operative position having a portion thereof extending into the cell for controlling the area of eating by the animal within the feed opening.

3. In a self-feeder silo, in combination, a storage cell for silage having a feeding zone and a plurality of feed openings about the base thereof, means within the cell within the contained mass of silage for dividing the silage and constantly urging the silage in the feeding zone toward the feed openings, and means mounted within the cell at each feed opening preventing ejection of the silage through the opening while permitting an animal to eat into the silage, said means including spaced uprights and spaced top bars connected therewith, and a plate having an upper section and a lower section angularly related thereto, the plate being mounted on the cell for swinging adjustment with the lower section adjacent to and closing access through said top bars to a feeding animal and to position with the lower section raised and all parts of the silage at the opening being accessible to a feeding animal.

4. In a self-feeder silo, in combination, a storage cell for silage having a feeding zone and a plurality of feed openings about the base of the cell, means within the cell within the contained mass of silage for dividing the silage and constantly urging the silage in the feeding zone toward the feed openings, and means mounted within the cell at each feed opening preventing ejection of the silage through the opening while preventing the animal from being trapped by falling silage, said means including spaced uprights mounted inwardly of the plane of the walls of the cell and spaced top bars connected with said spaced uprights and extending outwardly therefrom toward the plane of the walls of the cell.

5. In a self-feeder silo, in combination, a storage cell for silage having a feeding zone and a plurality of feed openings about the base thereof, means within the cell within the contained mass of silage for dividing the silage and constantly urging the silage in the feeding zone towards the feed openings, and means mounted within the cell at each feed opening for preventing ejection of the silage through the opening, said second-named means including a stationary structure directed downwardly and inwardly to extend partially across the feed opening, and said stationary structure having openings therein through which the silage is accessible to a feeding animal.

6. In a self-feeder silo, in combination, a storage cell for silage having a feeding zone and a plurality of feed openings about the base of the cell, means within the cell within the contained mass of silage for dividing the silage and constantly urging the silage in the feeding zone toward the feed openings, and means at each feed opening for preventing ejection of the silage through the opening while permitting all animals to eat into the silage, and a major portion of said second named means being inwardly spaced from the feed opening and extending partially across the feed opening.

7. In a self-feeder silo, in combination, a storage cell for silage having a feeding zone and a plurality of feed openings about the base of the cell, means within the cell within the contained mass of silage for dividing the silage and constantly urging the silage in the feeding zone toward the feed openings, and means mounted within the cell at each feed opening preventing ejection of the silage through the opening while permitting an animal to eat into the silage and preventing the animal from being trapped by falling silage, said second named means including an upright section having openings therein and a top section connected therewith and having openings therein.

8. A self-feeder silo including a storage cell for silage having a plurality of feed openings about the base thereof through which the silage is accessible to feeding cattle, and means for controlling the direction of eating by an animal, said means including a plate having an upper section and a lower section extending from said upper section at an angle thereto, and the plate being swingably mounted on the silo at a feed opening, the plate in an operative position having the lower section thereof extending into the cell and closing off a portion of the silage to access by the eating animal.

9. A self-feeder silo including a storage cell for silage having a plurality of feed openings about the base thereof through which the silage is accessible to feeding cattle, and means for controlling the direction of eating by an animal, said means including a plate having an upper section and a lower section rigidly formed therewith and extending therefrom at an angle thereto, and the upper section of the plate being hingedly mounted on the silo at a feed opening for swinging to adjusted positions, and means for releasably maintaining the plate in adjusted positions, the plate in an operative position having the lower section thereof extending into the cell and closing off a portion of the silage to access by the eating animal.

DANA W. RUEDEMANN.

References Cited in the file of this patent

UNITED STATES PATENTS

| Number | Name | Date |
|---|---|---|
| 375,824 | Light | Jan. 3, 1888 |
| 440,369 | Saucerman | Nov. 11, 1890 |
| 484,791 | Haifley | Oct. 25, 1892 |
| 1,155,189 | Adams | Sept. 28, 1915 |
| 1,210,116 | Swain | Dec. 26, 1916 |
| 1,301,051 | Hart | Apr. 15, 1919 |
| 1,359,209 | Wadsworth | Nov. 16, 1920 |
| 1,366,052 | Bettenga | Jan. 18, 1921 |
| 1,377,036 | Wadsworth | May 3, 1921 |
| 1,615,024 | Mabee | Jan. 18, 1927 |
| 1,693,611 | Mabee | Dec. 4, 1928 |
| 1,693,612 | Mabee | Dec. 4, 1928 |
| 1,884,779 | Mabee | Oct. 25, 1932 |
| 2,158,093 | Teske | May 16, 1939 |
| 2,158,094 | Teske | May 16, 1939 |
| 2,189,213 | MacDonell | Feb. 6, 1940 |
| 2,256,210 | MacDonell | Sept. 16, 1941 |
| 2,353,126 | Cecil | July 11, 1944 |
| 2,544,578 | Winkler | Mar. 6, 1951 |
| 2,626,591 | Mazur et al. | Jan. 27, 1953 |

FOREIGN PATENTS

| Number | Country | Date |
|---|---|---|
| 207,957 | Great Britain | Dec. 13, 1923 |

OTHER REFERENCES

Farm Structures. Reprint from Agricultural Engineering, vol. 29, No. 11, pages 488 and 489, November 1948.

These Self-Feeders. Reprint from New Jersey Farm and Garden, May 1950.